(12) United States Patent
Meshenky et al.

(10) Patent No.: US 9,038,609 B2
(45) Date of Patent: May 26, 2015

(54) CHARGE AIR COOLER, AND INTAKE MANIFOLD INCLUDING THE SAME

(71) Applicant: Modine Manufacturing Company, Racine, WI (US)

(72) Inventors: Steven Meshenky, Mt. Pleasant, WI (US); Jason Braun, Mt. Pleasant, WI (US); Christopher Moore, Racine, WI (US)

(73) Assignees: Modine Manufacturing Company, Racine, WI (US); Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 14/178,492

(22) Filed: Feb. 12, 2014

(65) Prior Publication Data

US 2014/0230797 A1 Aug. 21, 2014

Related U.S. Application Data

(60) Provisional application No. 61/766,031, filed on Feb. 18, 2013.

(51) Int. Cl.
*F02B 29/04* (2006.01)
*F02M 35/10* (2006.01)

(52) U.S. Cl.
CPC ...... *F02M 35/10268* (2013.01); *F02B 29/0418* (2013.01); *F02B 29/0437* (2013.01); *F02B 29/0443* (2013.01); *F02M 35/10242* (2013.01); *F02B 29/0462* (2013.01); *Y02T 10/146* (2013.01)

(58) Field of Classification Search
CPC ............ F02M 35/10; F02M 35/10268; F02M 35/10242; F02B 29/04; F02B 29/0462; F02B 29/0418; F02B 29/0437; F02B 29/0443; F02B 29/045
USPC ......... 123/540, 542, 563, 184.21; 165/41–44, 165/164–167, 51, 157–159, 172–176; 60/598, 599, 605.1
See application file for complete search history.

(56) References Cited

U.S. PATENT DOCUMENTS

| 4,187,678 | A | * | 2/1980 | Herenius | 60/321 |
| 4,214,443 | A | * | 7/1980 | Herenius | 60/321 |
| 4,236,492 | A | * | 12/1980 | Tholen | 123/563 |
| 4,303,052 | A | * | 12/1981 | Manfredo et al. | 123/563 |
| 4,436,145 | A | * | 3/1984 | Manfredo et al. | 165/67 |
| 4,474,162 | A | * | 10/1984 | Mason | 123/563 |
| 4,562,697 | A | * | 1/1986 | Lawson | 60/599 |
| 6,293,264 | B1 | * | 9/2001 | Middlebrook | 123/563 |
| 7,347,248 | B2 | * | 3/2008 | Kolb et al. | 165/42 |

(Continued)

*Primary Examiner* — Lindsay Low
*Assistant Examiner* — Grant Moubry
(74) *Attorney, Agent, or Firm* — Michael Best & Friedrich LLP

(57) ABSTRACT

An air intake manifold for an engine includes an air inlet to receive a flow of compressed charge air, and multiple runners to deliver cooled compressed charge air to corresponding combustion cylinders of the engine. A charge air cooler is arranged within the intake manifold between the air inlet and the runners, and includes a first core section and a second core section. The first and second core sections are arranged fluidly in parallel with respect to the flow of compressed charge air, so that the charge air is divided into a first portion that is substantially directed through the first core section to a first subset of the runners, and a second portion that is substantially directed through the second core section to a second subset of the runners.

20 Claims, 4 Drawing Sheets

(56) References Cited

U.S. PATENT DOCUMENTS

| | | | |
|---|---|---|---|
| 7,380,544 B2 * | 6/2008 | Raduenz et al. | 123/568.12 |
| 7,669,417 B2 * | 3/2010 | Smith | 60/599 |
| 8,225,852 B2 * | 7/2012 | Wu et al. | 165/140 |
| 8,286,615 B2 * | 10/2012 | Dehnen et al. | 123/542 |
| 8,316,925 B2 * | 11/2012 | Pimentel et al. | 165/152 |
| 8,695,574 B2 * | 4/2014 | Nguyen | 123/540 |
| 2008/0141985 A1 * | 6/2008 | Schernecker et al. | 123/568.12 |
| 2010/0071639 A1 * | 3/2010 | Wegner et al. | 123/41.08 |
| 2011/0017425 A1 | 1/2011 | Bourgoin et al. | |
| 2012/0167860 A1 * | 7/2012 | Wong et al. | 123/542 |

\* cited by examiner

CHARGE AIR COOLER, AND INTAKE MANIFOLD INCLUDING THE SAME

CROSS-REFERENCE TO RELATED APPLICATIONS

This application claims priority to U.S. Provisional Patent Application No. 61/766,031, filed Feb. 18, 2013, the entire contents of which are hereby incorporated by reference.

BACKGROUND

Charge air coolers are used in conjunction with turbocharged internal combustion engine systems. In such systems, residual energy from the combustion exhaust is recaptured through an exhaust expansion turbine, and the recaptured energy is used to compress or "boost" the pressure of the incoming air (referred to as the "charge air") being supplied to the engine. This raises the operating pressure of the engine, thereby increasing the thermal efficiency and providing greater fuel economy.

The compression of the charge air using the exhaust gases typically leads to a substantial increase in temperature of the air. Such a temperature increase can be undesirable for at least two reasons. First, the density of the air is inversely related to its temperature, so that the amount of air mass entering the combustion cylinders in each combustion cycle is lower when the air temperature is elevated, leading to reduced engine output. Second, the production of undesirable and/or harmful emissions, such as oxides of nitrogen, increases as the combustion temperature increases. The emissions levels for internal combustion engines is heavily regulated, often making it necessary to control the temperature of the air entering the combustion chambers to a temperature that is relatively close to the ambient air temperature. As a result, cooling of the charge air using charge air coolers has become commonplace for turbocharged engines.

In some applications, the charge air is cooled using a liquid coolant (for example, engine coolant). A charge air cooler that uses liquid coolant to cool the charge air can be mounted directly to the engine, and in some cases can be located directly within the air intake manifold of the engine. Such an arrangement can pose problems, however. In order to route the liquid coolant into and out of the charge air cooler, the flow of the charge air may be blocked in certain portions of the cooler. While attempts are made to minimize the impact of such blockages, they have been found to have substantial impact on the distribution of the air to each of the individual cylinders, causing inefficiencies in the operation of the engine. Thus, there is still room for improvement.

SUMMARY

According to an embodiment of the invention, an air intake manifold for an engine includes an air inlet to receive a flow of compressed charge air, and multiple runners to deliver cooled compressed charge air to corresponding combustion cylinders of the engine. A charge air cooler is arranged within the intake manifold between the air inlet and the runners, and includes a first core section, a second core section, a coolant inlet manifold, and a coolant outlet manifold. The coolant inlet manifold and the coolant outlet manifold are arranged between the first and second core sections. The first and second core sections are arranged fluidly in parallel with respect to the flow of compressed charge air, so that the charge air is divided into first portion that is substantially directed through the first core section to a first subset of the runners, and a second portion that is substantially directed through the second core section to a second subset of the runners.

In some embodiments of the invention, the coolant inlet and outlet manifolds substantially block the flow of charge air through a third section of the charge air cooler between the first and second core sections. In some embodiments the third section is aligned, in the flow direction of the cooled compressed charge air exiting the charge air cooler, with a spacing located between two adjacent runners. In some embodiments, the number of runners is even, and the two adjacent runners are the center-most two runners.

In some embodiments the first subset of the runners and the second subset of runners each consist of half of the runners. In some embodiments the first and second portions of the flow of charge air are substantially equal.

According to another embodiment of the invention, a charge air cooler includes a coolant inlet, a coolant outlet, a first coolant manifold to receive a flow of coolant from the coolant inlet, and a second coolant manifold to deliver coolant to the coolant outlet. The first and second coolant manifolds substantially block the flow of charge air through a centrally located section of the charge air cooler. A first set of coolant circuits extends between the first and second coolant manifolds in a first core section located adjacent to, and on a first side of, the centrally located section. A second set of coolant circuits extends between the first and second coolant manifolds in a second core section located adjacent to, and on a second side of, the centrally located section, opposite the first side. A first set of charge air flow channels extends through the first core section in heat transfer relationship with the first set of coolant circuits. A second set of charge air flow channels extends through the second core section in heat transfer relationship with the second set of coolant circuits.

In some embodiments the charge air cooler includes coolant plate pairs arranged into a stack configuration. The first and second sets of charge air flow channels are defined between adjacent plate pairs. In some embodiments each of the plate pairs includes a portion of the first coolant manifold and a portion of the second coolant manifold. A first coolant circuit that is part of the first set of coolant circuits extends between the portion of the first coolant manifold and the portion of the second coolant manifold. A second coolant circuit that is part of the second set of coolant circuits extends between the portion of the first coolant manifold and the portion of the second coolant manifold.

In some embodiments, the first set of charge air flow channels define a first flow area for the charge air, and the second set of charge air flow channels define a second flow area for the charge air. In some embodiments the first flow area is substantially equal to the second flow area.

In some embodiments coolant flowing through the first set of coolant circuits is in cross-counter flow orientation to charge air flowing through the first set of charge air flow channels. Coolant flowing through the second set of coolant circuits is in cross-counter flow orientation to charge air flowing through the second set of charge air flow channels.

In some embodiments, fin structures are arranged in the first and second sets of flow channels. In some such embodiments the fin structures define a correlation of pressure drop to charge air flow per unit area, and the correlation in the first section is substantially different than the correlation in the second section.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
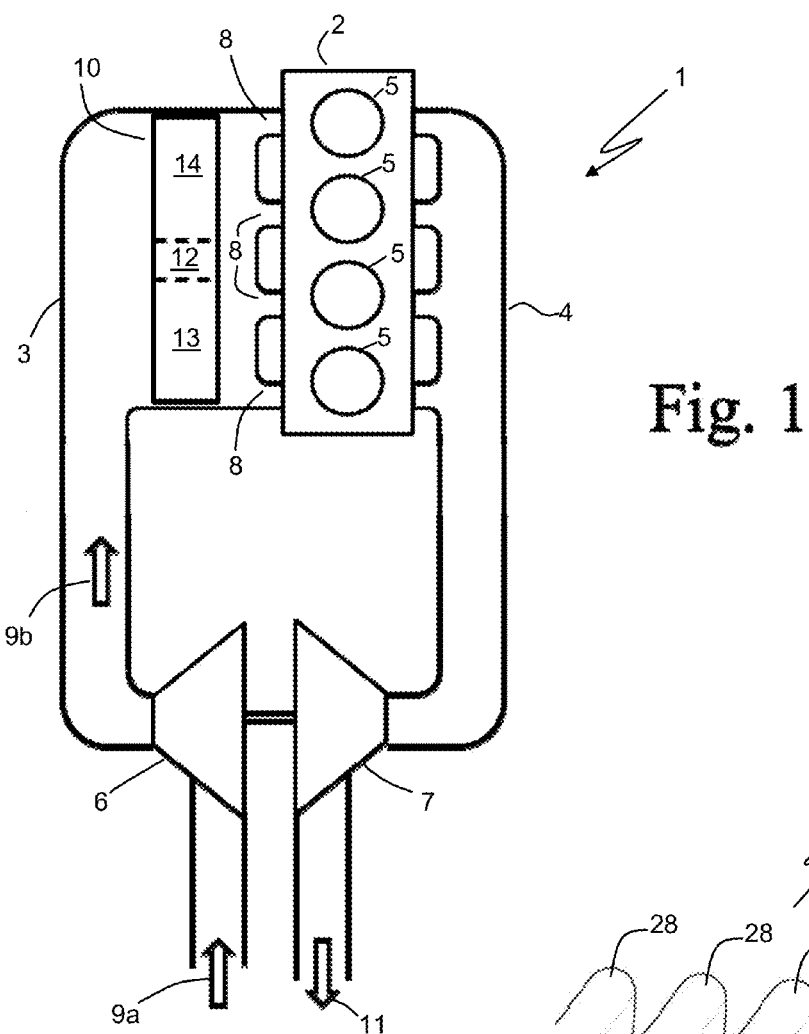
FIG. 1 is a schematic diagram of a portion of an engine system including an embodiment of the present invention.
Figure 8:
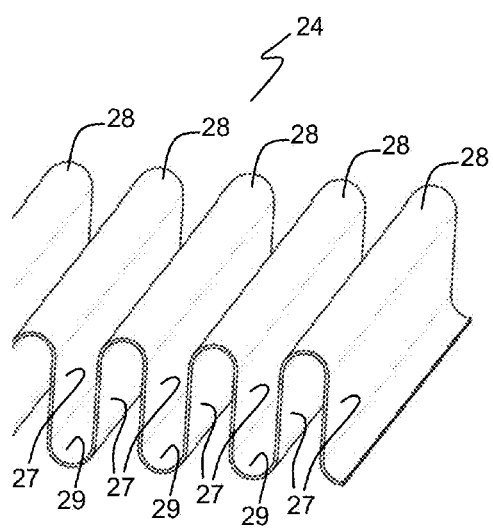
FIG. 8 is a partial view of certain parts of the charge air cooler of FIGS. 4 and 5.
Figure 2:
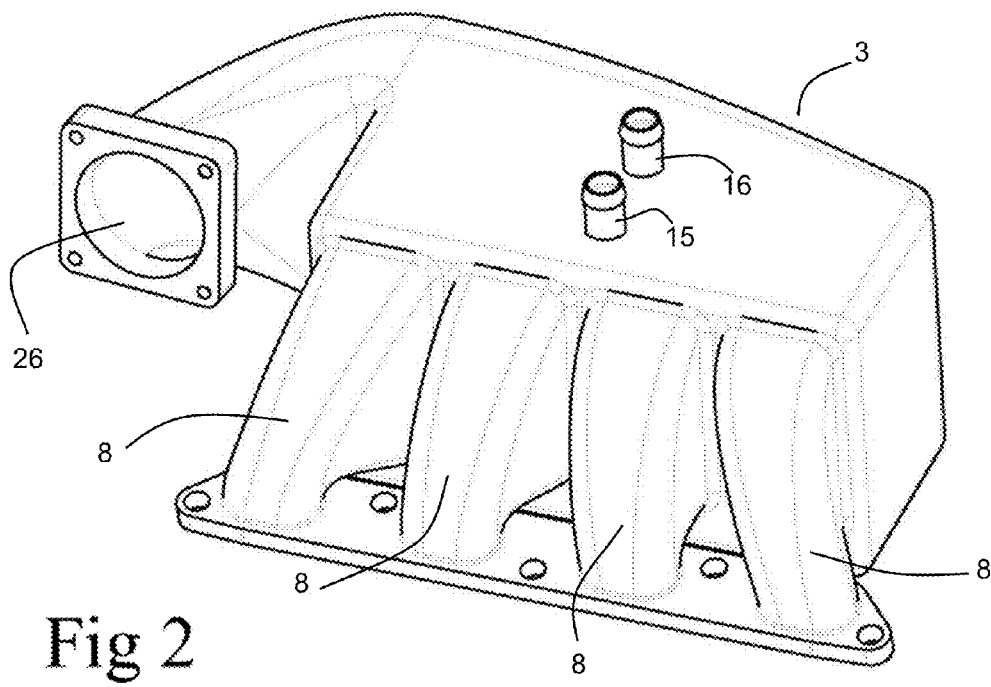
FIG. 2 is a perspective view of an intake manifold according to an embodiment of the invention.

A portion of a combustion engine system 1 according to an embodiment of the invention is illustrated in FIG. 1. The illustrated engine system 1 may find particular applicability as a motive power source for an automobile or similar vehicle. Alternatively, the engine system 1 can be used in other vehicular applications including commercial vehicles, vocational vehicles, off-highway vehicles, agricultural vehicles, etc., or in stationary power generation applications, or in other applications that make use of a combustion engine to produce useful work.

The system 1 includes an engine block 2 containing several combustion cylinders 5. In the illustrated embodiment the engine block 2 contains four such cylinders 5, but it should be understood that the invention can be used in similar fashion in a system containing more, or fewer, combustion cylinders. A flow of uncompressed air 9a is delivered to the cylinders 5 by way of a compressor or turbocharger 6, wherein the air is compressed to a pressurized flow of charge air 9b. The flow of charge air 9b is directed through an intake manifold 3, and is routed to the combustion cylinders 5 through runners 8, the runners 8 being in a one-to-one correspondence with the cylinders 5.

Due to thermodynamic inefficiencies in the compression process, the flow of charge air 9b enters the intake manifold at a temperature that is substantially elevated from that of the incoming air 9a. Such an elevated temperature can be undesirable, as it can lead to an increase in the concentration of some regulated harmful emissions (for example, oxides of nitrogen) in the exhaust of the engine. In order to ameliorate the foregoing, a charge air cooler 10 is provided within the intake manifold 3 upstream of the runners 8. The charge air cooler 10 includes several sections (numbered 12, 13, and 14) which will be described in greater detail with reference to FIGS. 2-8.

The charge air 9b, having been cooled by passing through the charge air cooler 10, is distributed among the runners 8 and enters the cylinders 5, wherein it is used as the oxidizer for the combustion of a liquid or gaseous fuel. The resultant exhaust 11 exits the cylinders 5 into an exhaust manifold 4 and is directed through an expansion turbine 7 coupled to compressor 6, wherein residual energy contained in the exhaust 11 is used to compress the incoming air 9a.

It should be understood by those skilled in the art that only a relevant portion of the engine system 1 has been shown, and that the engine system 1 includes many additional components which have not been included for the sake of clarity.

Turning now to FIGS. 2-8, the air intake manifold 3 and integrated charge air cooler 10 will be described in greater detail. As illustrated, the air intake manifold 3 includes an inlet 26 to receive the flow of compressed and heated charge air 9b from the compressor 6. The charge air cooler 10 is arranged within the air intake manifold 3 and extends across the full width and height of the air intake manifold 3 so that the undesirable bypassing of charge air around the charge air cooler 10 is reduced or eliminated. Heat is transferred from the flow of charge air 9b as it passes through the charge air cooler 10 to a flow of coolant simultaneously passing through the charge air cooler 10.

A coolant inlet port 15 and a coolant outlet port 16 extend through the exterior wall of the air intake manifold 3, and allow the charge air cooler 10 to be fluidly coupled to a coolant system (not shown) so that coolant can be delivered to charge air cooler 10 by way of the coolant inlet port 15, and can be removed from the charge air cooler 10 by way of the coolant outlet port 16. The coolant is circuited through the charge air cooler 10 between the coolant inlet port 15 and the coolant outlet port 16 so that the transfer of heat from the compressed charge air 9b as it passes through the charge air cooler 10 is facilitated, and the charge air exits the charge air cooler 10 as a flow of cooled charge air 9c.

It can be observed that the coolant inlet port 15 and the coolant outlet port 16 are arranged so as to coincide with a centrally located section 12 of the charge air cooler 10. By "centrally located", it is meant that the section 12 is arranged to be between a first core section 13 and a second core section 14 of the charge air cooler 10 in a width direction of the charge air cooler 10. While the illustrated embodiment shows that the first core section 13 and the second core section 14 are of equal dimension in the width direction, such that the section 12 is located at the true center of the charge air cooler 10 in the width direction, in other embodiments one of the core sections 13, 14 can be larger than the other of the core sections 13, 14. In such an embodiment the section 12 will not be located at the exact center of the charge air cooler 10 in the width direction, but is still considered to be centrally located.

Figure 5:
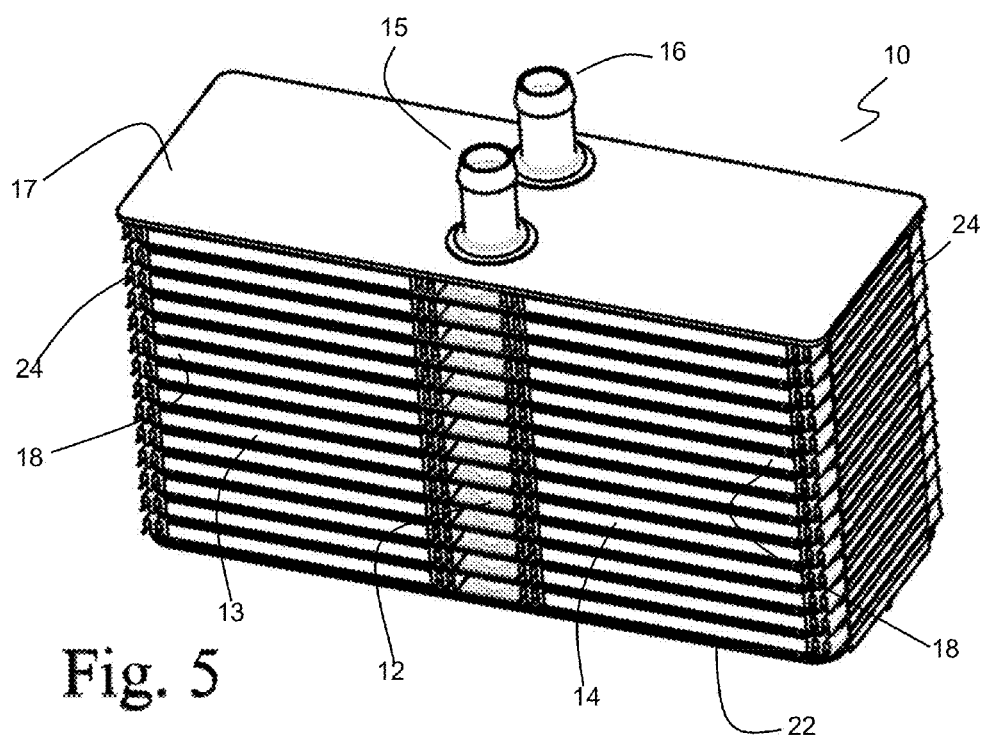
FIG. 5 is a perspective view of a charge air cooler according to an embodiment of the invention.
Figure 6:
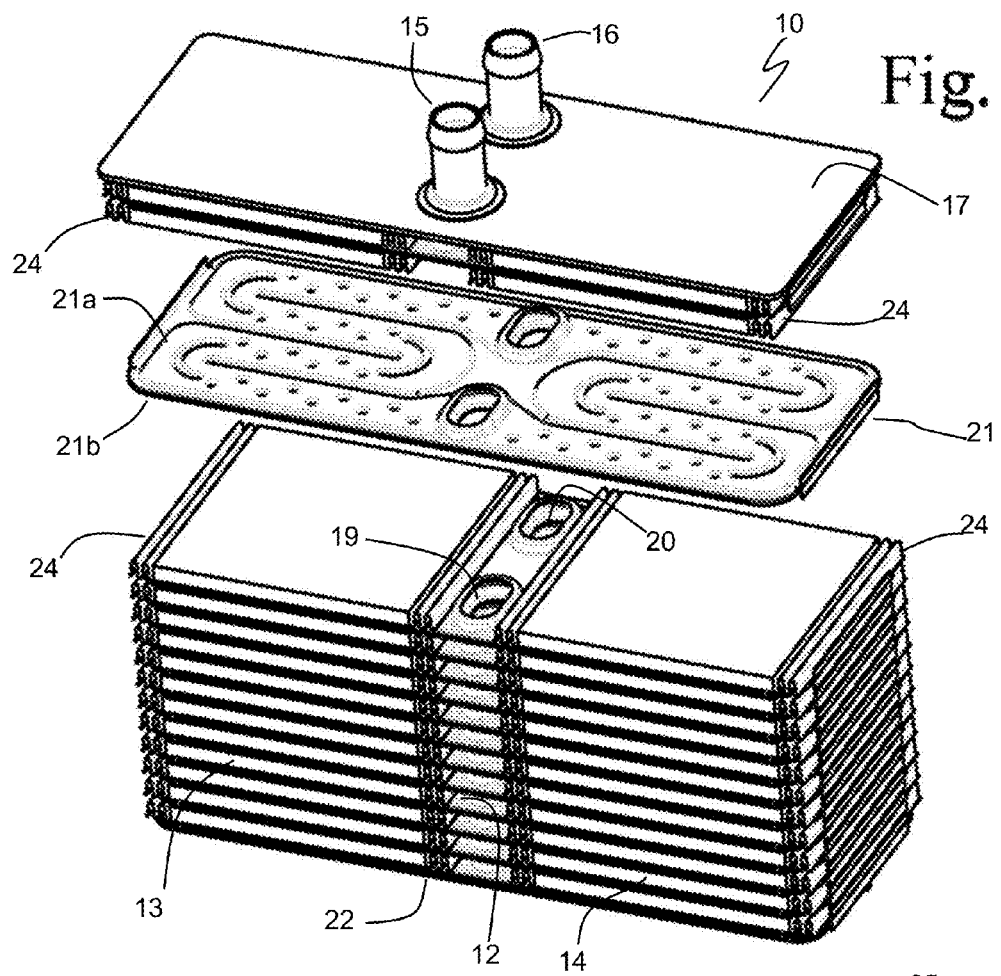
FIG. 6 is a perspective view of the charge air cooler of FIG. 5 in a partially exploded state.

With specific reference to FIGS. 5 and 6, the exemplary embodiment of the charge air cooler 10 is of a stacked or layered construction. Coolant plate pairs 21 are interleaved with charge air flow passages 18 between a top plate 17 and a bottom plate 22. A coolant inlet manifold 19 extends through the stack of coolant plate pairs 21 and fluidly connects to the coolant inlet port 15 to receive the flow of coolant and distribute it to each of the coolant plate pairs 21. Similarly, a coolant outlet manifold 20 extends through the stack of coolant plate pairs 21 and fluidly connects to the coolant outlet port 16 to receive the flow of coolant from each of the coolant plate pairs 21. Each of the coolant plate pairs 21 defines a portion of the coolant inlet manifold 19, and a portion of the coolant outlet manifold 20.

Each of the coolant plate pairs includes a first plate 21a and a second plate 21b. The plate 21a and the plate 21b are joined to define a sealed outer perimeter and an internal volume within the coolant plate pair 21, with that internal volume fluidly communicating with the coolant inlet manifold 19 and the coolant outlet manifold 20. The plates 21a and 21b together define between them a first coolant circuit 30 extending between the coolant inlet manifold 19 and the coolant outlet manifold 20 through the first core section 13. Similarly, the plates 21a and 21b together define between them a second coolant circuit 31 extending between the coolant inlet manifold 19 and the coolant outlet manifold 20 through the second core section 14.

In the illustrated embodiment the coolant circuits 30 and 31 defined by each plate pair 21 are all arranged in parallel with one another, such that the coolant flow entering the charge air cooler 10 by way of the coolant inlet port 15 is distributed, by way of the coolant inlet manifold 19, to each of the individual coolant circuits 30 and 31 in somewhat equal proportion. In other embodiments, it may be preferable to arrange at least some of the coolant circuits 30, 31 to be in series with other such coolant circuits, such as by including flow baffles within the manifolds 19 and 20. Dimples 25 can be provided (but are not required) in the plates 21a and 21b, and can provide both flow turbulation for the coolant passing through the coolant flow circuits 30 and 31, and structural support for the plate pair 21. Alternatively, one or more inserts can be provided within the space between the plates 21a and 21b to provide similar effect.

Figure 7:
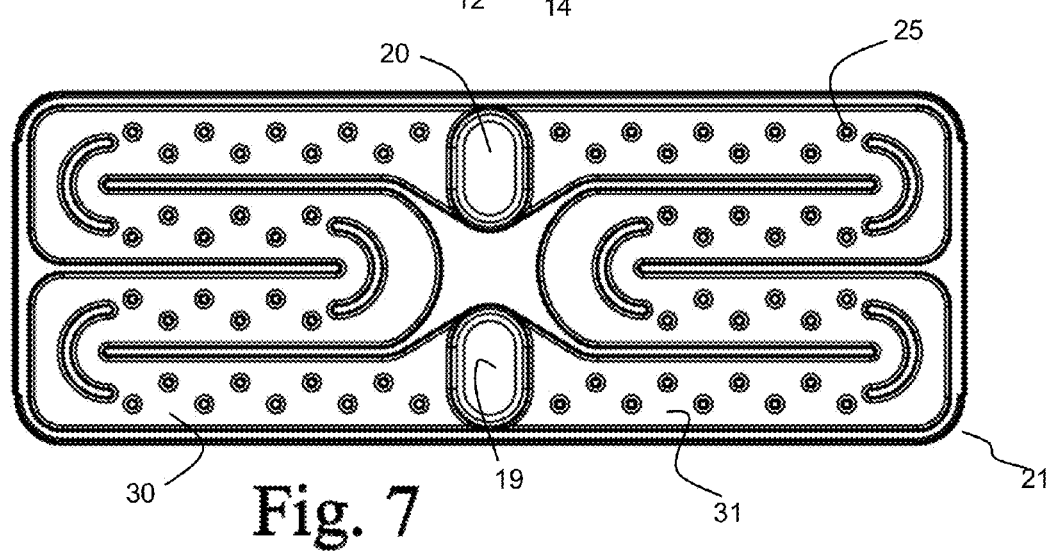
FIG. 7 is a plan view of certain parts of the charge air cooler of FIGS. 4 and 5.

As best seen in FIG. 7, in the exemplary embodiment the coolant circuits 30 and 31 define a convoluted path between the manifolds 19 and 20, with each circuit 30 and each circuit 31 including multiple passes in the width direction of the charge air cooler 10. The specific embodiment shown in the Figures includes four such passes, but it should be understood that more or fewer passes may be desirable in other embodiments.

As one advantage of the present invention, by locating the manifolds 19 and 20 at the center of the charge air cooler 10 in the width direction, rather than at the ends, the resulting pressure drop imposed on the coolant as it passes through the charge air cooler 10 can be substantially reduced. Specifically, for a given number of coolant passes across the depth of the charge air cooler 10, the total flow length between the manifolds 19 and 20 is reduced by half, while the total coolant flow area within each plate pair 21 is doubled, resulting in one-fourth the coolant pressure drop as compared to a more conventional charge air cooler having the coolant manifolds located at one of the ends. Achieving a similarly desirable pressure drop in such a conventional charge air cooler would necessitate reducing the number of convolutions to two. It is known, however, that the heat transfer effectiveness increases as the number of coolant passes arranged in a counter-cross flow orientation to the charge air is increased, making such a charge air cooler less desirable than the charge air cooler 10.

As another advantage of the present invention, the undesirable bypassing of uncooled charge air 9b around the charge air cooler 10 is significantly reduced by extending the charge air flow channels 18 to both outer edges of the charge air cooler in the width direction. Such an arrangement avoids the difficulties inherent in sealing off bypass flow around the coolant manifolds by arranging the core sections 13 and 14 on either side of the coolant manifolds 19 and 20. Additionally, the structural stresses induced by differential thermal expansion of the charge air cooler 10 relative to the air intake manifold 3 are substantially reduced by relocating the coolant inlet and outlet ports 15 and 16 to the center of the charge air cooler 10, thereby reducing by half the free length of the charge air cooler 10.

Figure 3:
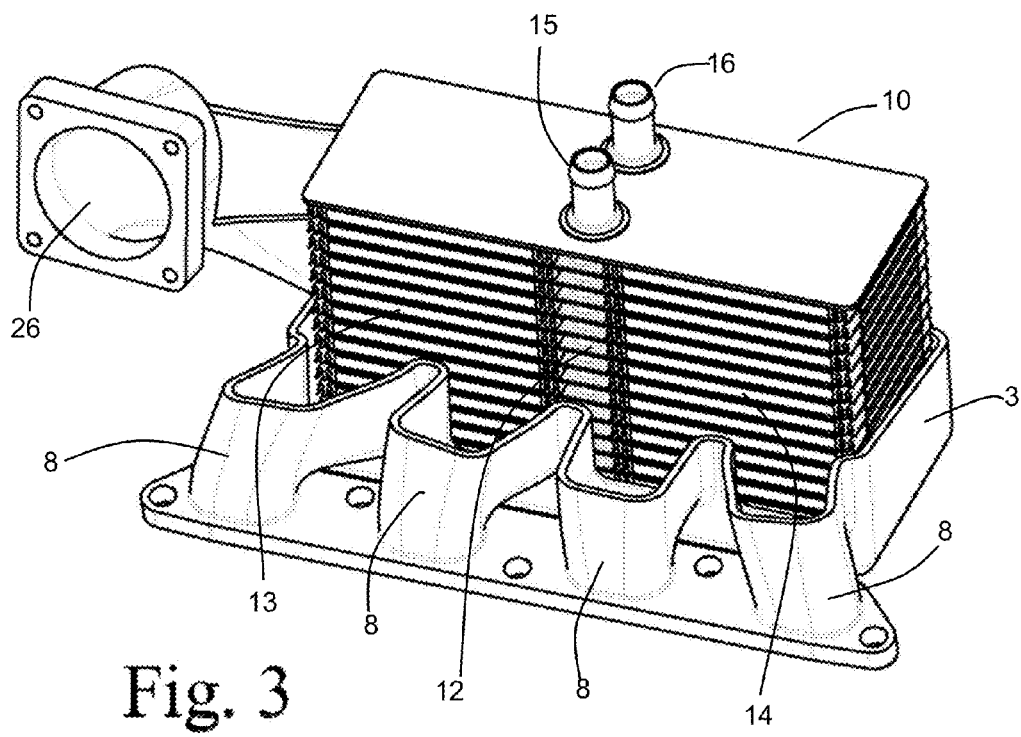
FIG. 3 is a partially sectioned perspective view of the intake manifold of FIG. 2.

In order to improve the rate of heat transfer from the compressed charge air 9b, as well as to provide structural support to adjacent plates pairs 21, convoluted fin structures 24 are arranged within the charge air flow passages 18. Aspects of the convoluted fin structures 24 are specifically detailed in FIG. 8. In FIGS. 3, 5, and 6 only the end few convolutions of each structure 24 are illustrated, but it should be understood that the convolutions extend in similar fashion over the entirety of each structure 24.

Each convoluted fin structure 24 includes a series of flanks 27 extending in the charge air flow direction, each of the flanks 27 joined to one (in the case of the end flanks) or two adjacent flanks 27 by alternatingly arranged crests 28 and troughs 29. The flanks 27 can be planar, as shown in the illustrated embodiment, or can be augmented with heat transfer enhancing features such as corrugations, lances, louvers, bumps, or other types of surface augmentations known to those skilled in the art of heat transfer. The convoluted fin structures 27 can be readily formed from a continuous sheet of metal material by stamping or rolling. As the charge air 9b passes through the charge air flow passages 18, heat from the charge air 9b is convectively transferred to the exposed surface area of the convoluted fin structures 24, and is conductively transferred to the plate pairs 21 through the contact therewith of the crests 28 and troughs 29.

In certain preferable embodiments the charge air cooler 10 components (e.g. the plates 21a and 21b, the convoluted fin structures 24, the top plate 17, the bottom plate 22, the coolant inlet 15, and the coolant outlet 16) are made of aluminum or an aluminum alloy. In some highly preferable embodiments some or all of the charge air cooler 10 components are joined together by brazing.

Figure 4:
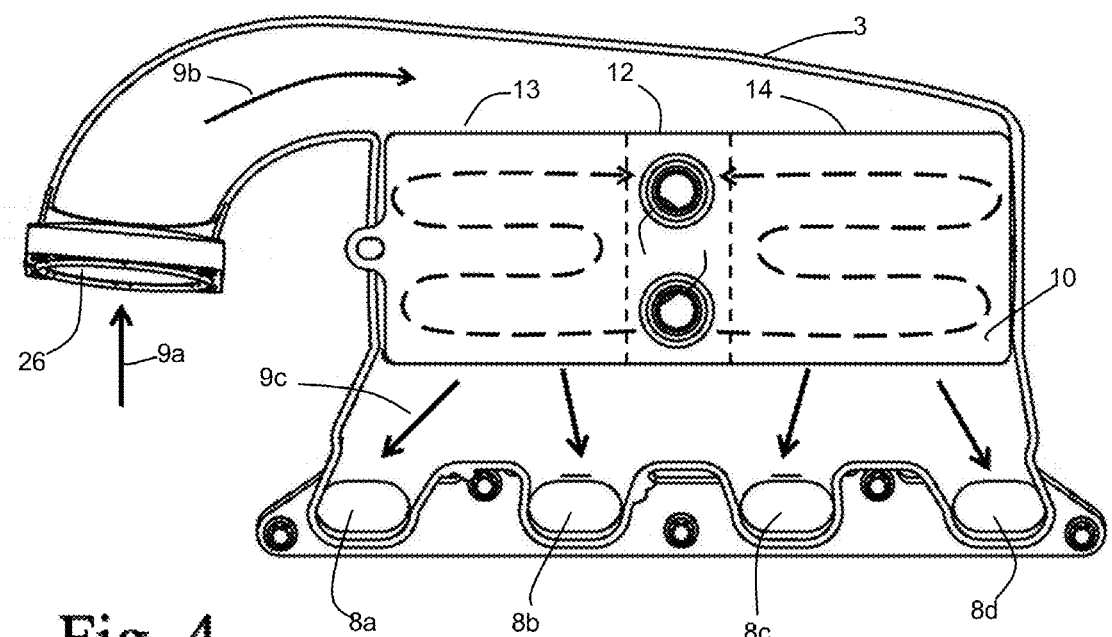
FIG. 4 is a plan view of the intake manifold of FIGS. 2 and 3.

With specific reference to FIG. 4, it can be observed that the centrally located section 12 of the charge air cooler 10 is aligned, in the direction of the charge air flow through the charge air cooler 10, with the space between the central-most ones of the runners 8 (i.e. runner 8b and runner 8c). The manifolds 19 and 20 extending through the centrally located section 12 substantially block the passage of charge air 9b through that section, so that substantially all of the charge air 9b is directed, in somewhat equal proportion, through the core sections 13 and 14.

With the flow of charge air 9b being distributed approximately evenly through the sections 13 and 14, and with an equal number of runners 8 arranged on either side of the centrally located section 12, a uniform distribution of cooled charge air 9c to each of the runners 8 can be achieved. Specifically, that portion of the charge air 9b passing through the core section 13 is distributed as cooled charge air 9c to the runners 8a and 8b, while that portion of the charge air 9b passing through the core section 14 is distributed as cooled charge air 9c to the runners 8c and 8d. Computational analysis has shown that such an arrangement is capable of providing substantially uniform distribution of the cooled charge air 9c to all of the runners 8. In contradistinction, similar analysis has shown that a charge air cooler with the coolant inlet and outlet manifolds arranged at one of the ends of the cooler can lead to the runner located at that same end receiving only half of its proportion of air.

In some embodiments, certain aspects of the charge air cooler 10 can be adjusted to further improve the distribution of cooled charge air 9c. For example, the profile of the intake manifold between the inlet 26 and the inlet face of the charge air cooler 10 might not be optimized for uniform distribution of the charge air 9b to each of the core sections 13 and 14. To overcome this, the centrally located section 12 can be shifted to one side of the exact center, so that one of the sections 13, 14 has a greater width than the other of the sections 13, 14, thus increasing the amount of air flow through that one of the sections. Alternatively, the widths of the sections 13, 14 can be kept uniform, and specific aspects of the convoluted fin structures 24 can be adjusted so that they are different in the two sections. For example, the spacing between adjacent flanks 27 can be reduced in that one of the sections 13, 14 which would otherwise receive more flow, so that the correlation of pressure drop to charge air flow per unit area in that section is greater than such correlation in the other one of the sections.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. An air intake manifold for an engine, comprising:
   an air inlet to receive a flow of compressed charge air;
   a plurality of runners to deliver cooled compressed charge air to a corresponding plurality of combustion cylinders of the engine; and
   a charge air cooler arranged within the intake manifold between the air inlet and the runners, the charge air cooler comprising a first core section, a second core section, a coolant inlet manifold, and a coolant outlet manifold, the coolant inlet manifold and the coolant outlet manifold arranged between the first and second core sections, the first and second core sections arranged fluidly in parallel with respect to the flow of compressed charge air to divide the flow of compressed charge air into a first portion substantially directed through the first core section to a first subset of the plurality of runners, and a second portion substantially directed through the second core section to a second subset of the plurality of runners.

2. The air intake manifold of claim 1, wherein the coolant inlet manifold and the coolant outlet manifold substantially block the flow of charge air through a third section of the charge air cooler between the first core section and the second core section.

3. The air intake manifold of claim 2, wherein the third section of the charge air cooler is aligned, in the flow direction of the cooled compressed charge air exiting the charge air cooler, with a spacing located between a first one of the plurality of runners and an adjacent second one of the plurality of runners.

4. The air intake manifold of claim 3, the plurality of runners comprising an even number of runners in a linear arrangement, said first one and said second one of the plurality of runners being the center-most two of the plurality of runners.

5. The air intake manifold of claim 1, wherein the first subset of the plurality of runners and the second subset of the plurality of runners each consist of half of the plurality of runners.

6. The air intake manifold of claim 1, wherein the first and second portions of the flow of compressed charge air are substantially equal.

7. A charge air cooler comprising:
   a coolant inlet;
   a coolant outlet;
   a first coolant manifold in fluid communication with the coolant inlet to receive a flow of coolant therefrom and a second coolant manifold in fluid communication with the coolant outlet to deliver coolant thereto, the first and second coolant manifolds substantially blocking the flow of charge air through a centrally located section of the charge air cooler;
   a first plurality of coolant circuits extending between the first and second coolant manifolds in a first core section arranged adjacent to the centrally located section on a first side thereof;
   a second plurality of coolant circuits extending between the first and second coolant manifolds in a second core section arranged adjacent to the centrally located section on a second side thereof opposite the first side;
   a first plurality of charge air flow channels extending through the first core section in heat transfer relationship with the first plurality of coolant circuits; and
   a second plurality of charge air flow channels extending through the second core section in heat transfer relationship with the second plurality of coolant circuits.

8. The charge air cooler of claim 7, further comprising a plurality of coolant plate pairs arranged into a stack configuration, the first and second plurality of charge air flow channels being defined between adjacent ones of the coolant plate pairs.

9. The charge air cooler of claim 8, each of the coolant plate pairs comprising:
   a portion of the first coolant manifold;
   a portion of the second coolant manifold;
   a first coolant circuit extending between the portion of the first coolant manifold and the portion of the second coolant manifold, the first coolant circuit being one of the first plurality of coolant circuits; and
   a second coolant circuit extending between the portion of the first coolant manifold and the portion of the second coolant manifold, the second coolant circuit being one of the second plurality of coolant circuits.

10. The charge air cooler of claim 7, wherein the first plurality of charge air flow channels define a first flow area for the charge air, the second plurality of charge air flow channels define a second flow area for the charge air, and the first flow area is substantially equal to the second flow area.

11. The charge air cooler of claim 7, wherein coolant flowing through the first plurality of coolant circuits is in cross-counter flow orientation to charge air flowing through the first plurality of charge air flow channels, and wherein coolant flowing through the second plurality of coolant circuits is in cross-counter flow orientation to charge air flowing through the second plurality of charge air flow channels.

12. The charge air cooler of claim 7, further comprising a plurality of fin structures arranged in the first and second plurality of charge air flow channels.

13. The charge air cooler of claim 12, wherein each of the plurality of fin structures defines a correlation of pressure drop to charge air flow per unit area, said correlation in the first core section being substantially different than said correlation in the second core section.

14. An air intake manifold with integrated charge air cooling, comprising:
   an air inlet to receive a flow of compressed charge air;
   one or more first air outlets to remove a first portion of the flow of compressed charge air;
   one or more second air outlets to remove a second portion of the flow of compressed charge air;
   a first heat exchange section arranged between the air inlet and the one or more first air outlets to cool the first portion of the flow of compressed air;
   a second heat exchange section arranged between the air inlet and the one or more second air outlets to cool the second portion of the flow of compressed air; and
   first and second coolant flow paths extending through the first and second heat exchange sections respectively, the first and second coolant flow paths both extending from a coolant inlet manifold to a coolant outlet manifold, the coolant inlet manifold and coolant outlet manifold being arranged between the first and second heat exchange sections.

15. The air intake manifold of claim 14, wherein the coolant inlet manifold and coolant outlet manifold substantially prevent the flow of compressed charge air from passing between the first and second heat exchange sections.

16. The air intake manifold of claim 14, wherein the first coolant flow path is in cross-counter flow orientation to the first portion of the flow of compressed charge air, and the second coolant flow path is in cross-counter flow orientation to the second portion of the flow of compressed charge air.

17. The air intake manifold of claim 14, wherein each of the first and second coolant flow paths comprises a plurality of parallel arranged channels.

18. The air intake manifold of claim 17, wherein the plurality of parallel arranged channels are defined by a stack of plate pairs, each plate pair defining a first one of said channels corresponding to the first coolant flow path, and a second one of said channels corresponding to the second flow path.

19. The air intake manifold of claim 18, wherein the coolant inlet manifold and coolant outlet manifold are defined by the stack of plate pairs.

20. The air intake manifold of claim 14, wherein the first and second heat exchange sections are equal in size.

\* \* \* \* \*